US007855658B2

(12) United States Patent
Chang

(10) Patent No.: US 7,855,658 B2
(45) Date of Patent: Dec. 21, 2010

(54) METHOD FOR CONTROLLING LIGHT

(76) Inventor: Chris Chang, P.O. Box 46-563, Taipei, Taipei City, 10499 (TW) 104

( * ) Notice: Subject to any disclaimer, the term of this patent is extended or adjusted under 35 U.S.C. 154(b) by 318 days.

(21) Appl. No.: 12/228,031

(22) Filed: Aug. 11, 2008

(65) Prior Publication Data

US 2009/0044625 A1 Feb. 19, 2009

(30) Foreign Application Priority Data

Aug. 13, 2007 (TW) .............................. 96129922 A

(51) Int. Cl.
*G01P 15/08* (2006.01)

(52) U.S. Cl. ............................ 340/815.65; 340/815.52; 340/815.77

(58) Field of Classification Search ............ 340/815.65, 340/815.52, 815.56, 815.6, 815.66, 815.68, 340/815.45, 815.77; 73/514.26; 315/76, 315/80

See application file for complete search history.

(56) References Cited

U.S. PATENT DOCUMENTS

2005/0264472 A1* 12/2005 Rast ............................ 345/30
2007/0211013 A1* 9/2007 Uehara et al. ............... 345/102

* cited by examiner

*Primary Examiner*—Toan N Pham

(57) ABSTRACT

Provided is a method for controlling light, including retrieving accelerations along an X-axis, a Y-axis, and a Z-axis with a 3-axis accelerometer sensor; matching the retrieved accelerations with RGB values; and transforming the RGB values and displaying a color of the transformed RGB values. The 3-axis accelerometer sensor retrieves the accelerations Ax, Ay, and Az along the X-axis, the Y-axis, and the Z-axis and calculates a velocity Vi along the X-axis, the Y-axis, and the Z-axis using the accelerations Ax, Ay, and Az, with i denoting directions x, y, and z, Vi=Vio+Ait expressing a terminal velocity in the direction i, Vio denoting an initial velocity in the direction i, Ai denoting the acceleration in the direction i, and t denoting time, thereby allowing variation of brightness to be controlled in eight modes.

5 Claims, 2 Drawing Sheets

METHOD FOR CONTROLLING LIGHT

BACKGROUND OF THE INVENTION

1. Technical Field

The present invention relates to methods for controlling light, and more particularly, to a method for controlling light using a 3-axis accelerometer sensor.

2. Description of Related Art

None.

SUMMARY OF THE INVENTION

The present invention provides a method for controlling light, comprising the steps of retrieving accelerations along an X-axis, a Y-axis, and a Z-axis with a 3-axis accelerometer sensor; matching the retrieved accelerations with RGB values; and transforming the RGB values and displaying a color of the transformed RGB values. The 3-axis accelerometer sensor retrieves the accelerations Ax, Ay, and Az along the X-axis, the Y-axis, and the Z-axis and calculates a velocity Vi along the X-axis, the Y-axis, and the Z-axis using the accelerations Ax, Ay, and Az, with i denoting directions x, y, and z, Vi=Vio+Ait expressing a terminal velocity in the directions i, Vio denoting an initial velocity in the direction i, Ai denoting the acceleration in the direction i, and t denoting time, thereby allowing variation of brightness to be controlled in eight modes comprising:

1. Average absolute acceleration AA, wherein $$AA=((|Ax|+|Ay|+|Az|)/3);$$

2. Scalar magnitude VA of vector acceleration, wherein $$VA=\sqrt{(Ax^2+Ay^2+Az^2)};$$

3. Differentiation DA between consecutive points of time t1 and t2 in scalar magnitude VA of vector acceleration, wherein $$DA=VA_{t2}-VA_{t1},$$

$$VA=\sqrt{(Ax^2+Ay^2+Az^2)},$$

t1 denotes point of time 1, and t2 denotes point of time 2;

4. Differentiation DAx, DAy, and DAz between consecutive points of time t1 and t2 in accelerations Ax, Ay, and Az along the X-axis, the Y-axis, and the Z-axis, wherein $$DAx=Axt2-Axt1,$$

$$DAy=Ayt2-Ayt1, \text{ and}$$

$$DAz=Azt2-Azt1;$$

5. Average velocity AV, wherein $$AV=((|Vx|+|Vy|+|Vz|)/3);$$

6. Scalar magnitude VV of vector velocity, wherein $$VV=\sqrt{(Vx^2+Vy^2+Vz^2)};$$

7. Differentiation DV between consecutive points of time t1 and t2 in scalar magnitude VV of vector velocity, wherein $$VV=\sqrt{(Vx^2+Vy^2+Vz^2)},$$

$$DV=VV_{t2}-VV_{t1},$$

t1 denotes point of time 1, and t2 denotes point of time 2; and

8. Differentiation DVx, DVy, DVz between consecutive points of time t1 and t2 in velocities Vx, Vy, Vz along the three axes, wherein $$DVx=Vx_{t2}-Vx_{t1},$$

$$DVy=Vy_{t2}-Vy_{t1},$$

$$DVz=Vz_{t2}-Vz_{t1},$$

t1 denotes point of time 1, and t2 denotes point of time 2.

BRIEF DESCRIPTION OF THE DRAWINGS

The invention as well as a preferred mode of use, further objectives and advantages thereof will best be understood by reference to the following detailed description of an illustrative embodiment when read in conjunction with the accompanying drawings, wherein.

DETAILED DESCRIPTION OF THE PREFERRED EMBODIMENTS

Figure 1:
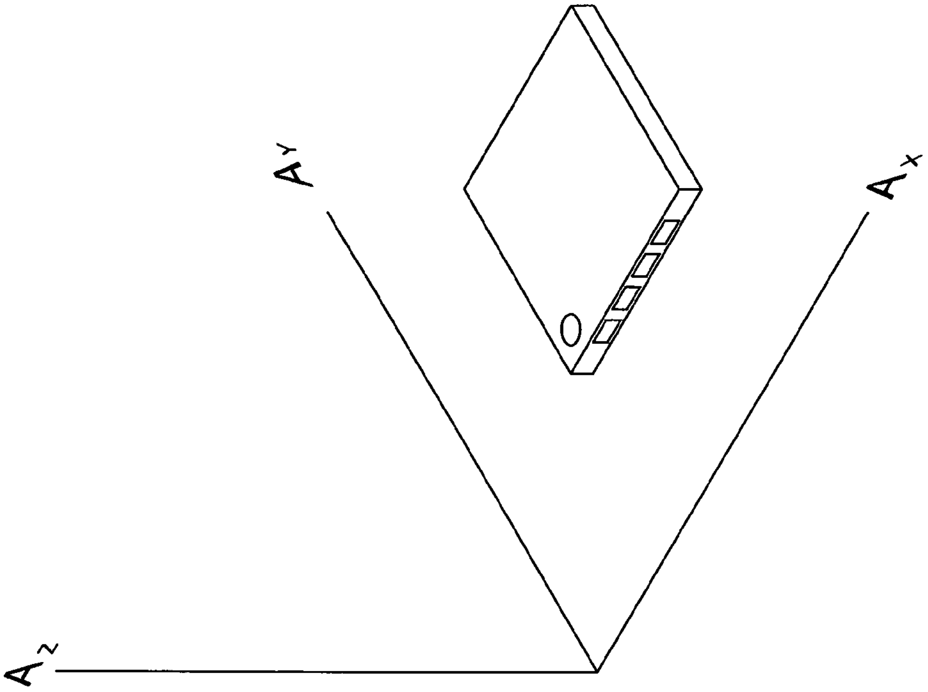
FIG. 1 shows a 3-axis accelerometer sensor typically in use.
Figure 2:
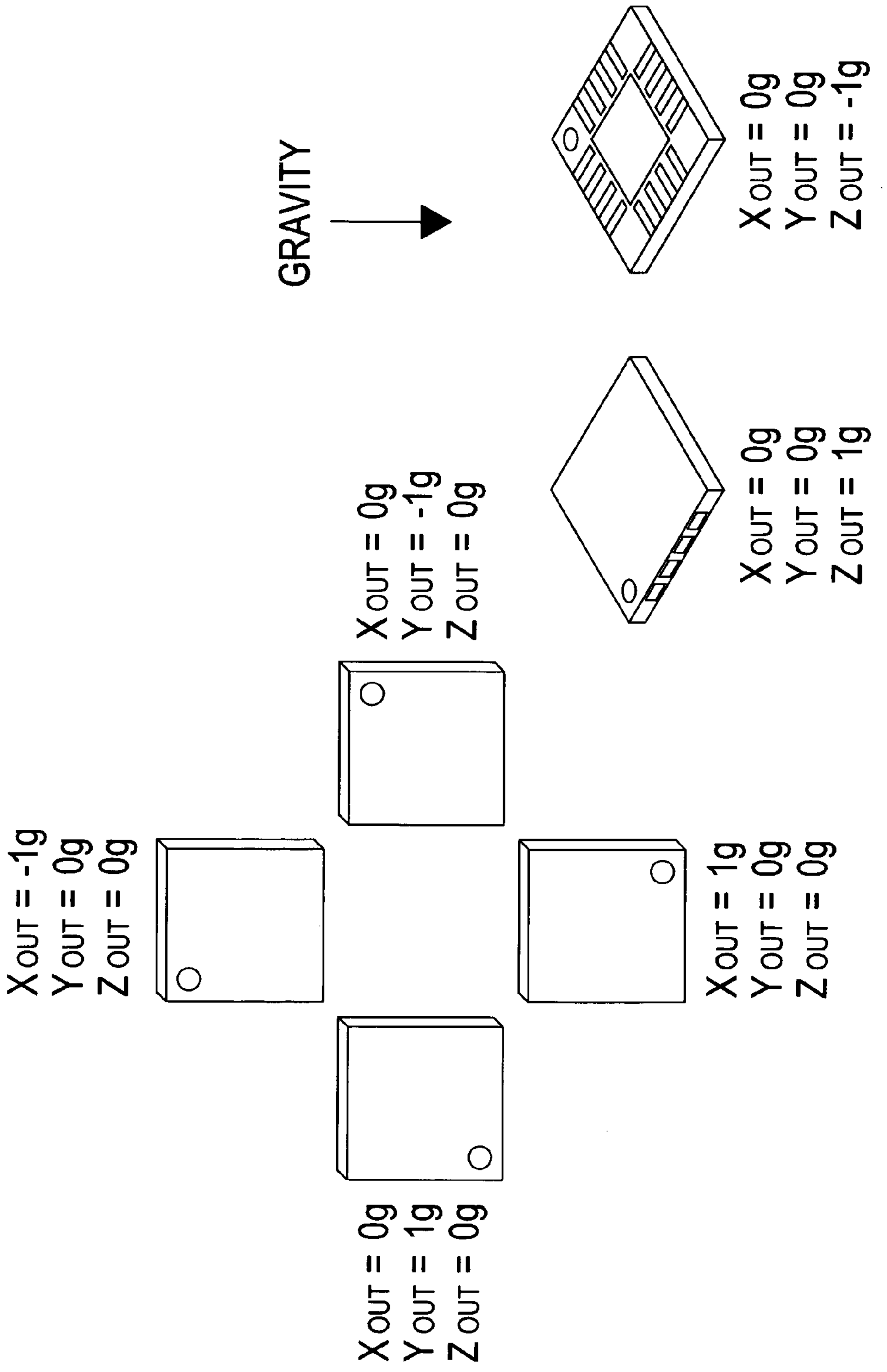
FIG. 2 is a schematic view showing arrangement of sensors adapted for quantitative analysis of motion along the three axes.

Referring to FIG. 1, a typical 3-axis accelerometer sensor senses acceleration (g) along an X-axis, Y-axis, and Z-axis and outputs the sensed acceleration in the form of electronic signals. Known entertainment-oriented 3-axis accelerometer sensors, such as ADI's accelerometer sensor ADXL330, measure acceleration with an error of ±3.00 g. The 3-axis accelerometer sensor disclosed in the present invention and described in the specification thereof is characterized by precision including for example, but not limited to, an error of ±2.00 g.

Also, acceleration along the three axes bear directional characteristics. For instance, where a hand-held 3-axis accelerometer sensor is moved straightly toward the right (+X), a reading of positive g is immediately followed by a brief reading of negative g. Likewise, where a hand-held 3-axis accelerometer sensor is move straightly toward the left (−X), a reading of negative g is immediately followed by a brief reading of positive g.

One of the steps of the method according to the present invention involves matching acceleration calculated by a 3-axis accelerometer sensor along the X-axis, Y-axis, and Z-axis with RGB values. This can be implemented in three ways, as shown in Table 1, depending on circumstances.

TABLE 1

| | |
|---|---|
| Unidirectional vector acceleration is measured and matched with RGB values. | X = R |
| | X = G |
| | X = B |
| | Y = R |
| | Y = G |
| | Y = B |
| | Z = R |
| | Z = G |
| | Z = B |

TABLE 1-continued

| | |
|---|---|
| A pair of vector accelerations is matched with RGB values. | X = R, Y = G |
| | X = R, Y = B |
| | X = G, Y = R |
| | X = G, Y = B |
| | X = B, Y = R |
| | X = B, Y = G |
| | Y = R, Z = G |
| | Y = R, Z = B |
| | Y = G, Z = R |
| | Y = G, Z = B |
| | Y = B, Z = R |
| | Y = B, Z = G |
| | Z = R, X = G |
| | Z = R, X = B |
| | Z = G, X = R |
| | Z = G, X = B |
| | Z = B, X = R |
| | Z = B, X = G |
| A trio of vector accelerations is matched with RGB values. | X = R, Y = G, Z = B |
| | X = R, Y = B, Z = G |
| | X = G, Y = B, Z = R |
| | X = G, Y = R, Z = B |
| | X = B, Y = R, Z = G |
| | X = B, Y = G, Z = R |

As regards color light, color light is generally based on three primary colors, namely R (red), G (green), and B (blue). The three primary colors are "basic colors" which cannot be brought about by mixing and blending other colors. Mixing the primary colors in different proportions creates other new colors. To provide full-color display, a color LED lamp has to comprise at least one red (R) LED, at least one green (G) LED, and at least one blue (B) LED, wherein each of the RGB values ranges from 0 to 255, with colorless display (without brightness) denoted by 0. In other words, given RGB values (0, 0, 0), a color LED lamp turns black as perceived with the naked eye.

Given RGB values (255, 255, 255), a color LED lamp turns white as perceived with the naked eye. The color LED lamp disclosed in the present invention comprises at least one red (R) LED, at least one green (G) LED, and at least one blue (B) LED. The present invention is exemplified by the LEDs.

As regards methodology of control, the 3-axis accelerometer sensor of the present invention retrieves data relating to acceleration along the X-axis, Y-axis, and Z-axis, and the retrieved acceleration-related data is defined so as to range between 0 and 255 and match with RGB values of an LED lamp. In this regard, the present invention proposes a control method for defining a correlation between the data retrieved along the X-axis, Y-axis, and Z-axis by the 3-axis accelerometer sensor and the RGB values.

To convert the correlation between data retrieved along the X-axis, Y-axis, and Z-axis by a 3-axis accelerometer sensor and RGB values into colors displayed by a color LED, the present invention discloses controlling the three colors of RGB by means of the data retrieved along the X-axis, Y-axis, and Z-axis respectively, namely controlling the red (R) color by means of the data retrieved along the X-axis, controlling the green (G) color by means of the data retrieved along the Y-axis, and controlling the blue (B) color by means of the data retrieved along the Z-axis. The present invention further discloses selecting a specific range of acceleration sensed by the 3-axis accelerometer sensor and matching the specific range of acceleration with a specific range of RGB values, as described in detail below.

The step of matching acceleration sensed by the 3-axis accelerometer sensor with color and variation thereof is exemplified herein by the red (R) color. According to the present invention, acceleration X sensed by the 3-axis accelerometer sensor is linearly correlated with the R value of the RGB values, as expressed by:

$$(Xu-X)/(X-X1)=(Ru-R)/(R-R1)$$

wherein R denotes a dependent variable, X denotes an independent variable and is the acceleration sensed by the 3-axis accelerometer sensor, Xu denotes the upper limit of X and is set to 1 g, X1 denotes the lower limit of X and is set to 0 g, Ru denotes the upper limit of red value and is set to 255, and R1 denotes the lower limit of red value and is set to 150. Acceleration X is substituted into the above equation to derive R. G value and B value are derived likewise.

The present invention further discloses selecting a specific range of g value (the acceleration sensed by the 3-axis accelerometer sensor), so as to effectuate a special effect, such as displaying a specific range of colors or brightness compulsorily, as shown in Table 2.

TABLE 2

| Control Method and Effect | Color or Range |
|---|---|
| If the accelerometer sensor moves in the +X direction, bright blue light will be on. | X = 0.00 g~1.00 g matched with B = 200~255 |
| If the accelerometer sensor moves in the −Z direction, dark red light will be on. | Z = 0.00 g~−1.00 g matched with R = 100~200 |
| Low average acceleration V is accompanied by correspondingly low brightness. | V < .2 g, brightness = 20% |
| High average acceleration V is accompanied by correspondingly high brightness. | V > .8 g, brightness = 80% |
| Variable average acceleration V is accompanied by correspondingly variable brightness. | V = .2 g~.8 g, brightness = 20%~80% |

Variation of brightness is controlled according to the present invention in eight modes as follows:

Brightness Variation 1: Average Absolute Acceleration

Variation of brightness is defined by the differentiation between average acceleration AA(AA=(|Ax|+|Ay|+|Az|)/3) and acceleration along each of the three axes. The rule of variation is defined as follows:

$$(AAu-AA)/(AA-AA1)=(Bu-Ba)/(Ba-B1)$$

wherein AAu denotes the upper limit of AA and equals 0.8 g, AA1 denotes the lower limit of AA and equals 0.2 g, Ba denotes the overall brightness of the three colors of RGB, Bu denotes the upper limit of Ba and equals 80%, and B1 denotes the lower limit of Ba and equals 20%.

After brightness has been calculated, specified RGB values are set with the calculated brightness. First, RGB values (197, 135, 22) are set as standard values corresponding to 100% brightness. Then, correlation between brightness and RGB values is calculated as follows: R/197=Ba/100%, G/135=Ba/100%, and B/22=Ba/100%. Note that a calculated R, G, or B value will be compulsorily set to 255 if the calculated R, G, or B value exceeds 255. In so doing, specific and proper RGB values can be obtained using Ba.

Brightness Variation 2: Vector Acceleration

Brightness variation 2 is similar to brightness variation 1 except that brightness variation 2 involves calculating vector acceleration VA, instead of average absolute acceleration, by calculating a mathematic norm, wherein $$VA=\sqrt{(Ax^2+Ay^2+Az^2)},$$

and the vector acceleration is correlated with the range of brightness, as expressed by the equation below:

$$(VAu-VA)/(VA-VA1)=(Bu-Ba)/(Ba-B1)$$

wherein

VAu=upper limit of vector acceleration, and

VA1=lower limit of vector acceleration.

Brightness Variation 3: Differentiation Between Consecutive Points of Time in Vector Acceleration Brightness variation 3 involves adjusting brightness using differentiation in vector acceleration between two consecutive datasets.

Where acceleration is measured at two points of time, t1=point of time 1 t2=point of time 2

Accelerations at point of time 1:

$Ax_{t1}$=acceleration along X-axis at point of time 1

$Ay_{t1}$=acceleration along Y-axis at point of time 1

$Az_{t1}$=acceleration along Z-axis at point of time 1

Accelerations at point of time 2:

$Ax_{t2}$=acceleration along X-axis at point of time 2

$Ay_{t2}$=acceleration along Y-axis at point of time 2

$Az_{t2}$=acceleration along Z-axis at point of time 2

Vector accelerations at the two points of time:

$$VA_{t1}=\sqrt{((Ax_{t1})^2+(Ay_{t1})^2+(Az_{t1})^2)}$$

$$VA_{t2}=\sqrt{((Ax_{t2})^2+(Ay_{t2})^2+(Az_{t2})^2)}$$

Differentiation in vector acceleration between the two points of time is defined as:

$$DA=VA_{t2}-VA_{t1}$$

An equation of its brightness range is as follows:

$$(DAu-DA)/(DA-DA1)=(Bu-Ba)/(Ba-B1)$$

wherein

DAu=upper limit of differentiation in acceleration, and

DA1=lower limit of differentiation in acceleration.

Brightness Variation 4: Differentiation Between Consecutive Points of Time in Acceleration Along the Three Axes Brightness variation 4 is similar to brightness variation 3 except that brightness variation 4 involves adjusting brightness of the three colors of RGB using the differentiation in acceleration along the three axes DAx, DAy, DAz respectively.

Differentiation between two points of time in acceleration along the three axes are defined as follows:

$DAx=Ax_{t2}-Ax_{t1}$=differentiation in acceleration along X-axis $DAy=Ay_{t2}-Ay_{t1}$=differentiation in acceleration along Y-axis $DAz=Az_{t2}-Az_{t1}$=differentiation in acceleration along Z-axis Brightness of different colors can be adjusted so as to acquire different color effects.

$$(DAu-DAx)/(DAx-DA1)=(Bu-Br)/(Br-B1)$$

$$(DAu-DAy)/(DAy-DA1)=(Bu-Bg)/(Bg-B1)$$

$$(DAu-DAz)/(DAz-DA1)=(Bu-Bb)/(Bb-B1)$$

wherein

DAu=upper limit of differentiation in acceleration,

DA1=lower limit of differentiation in acceleration,

Br=brightness of red,

Bg=brightness of green,

Bb=brightness of blue,

Bu=upper limit of brightness, and

B1=lower limit of brightness.

In the event of variation 1, correlation between brightness and RGB values is expressed as follows:

$$R/197=Br/100\%,$$

$$G/135=Bg/100\%, \text{ and}$$

$$B/22=Bb/100\%.$$

Brightness Variation 5: Average Velocity

Velocity is calculated from acceleration. Assuming that acceleration at the middle between two consecutive points of time is a constant, and that velocity is zeroed at point of time 1. Hence, velocity can be calculated using the constant acceleration equation expressed below:

$$Vf=Vi+At$$

wherein

Vf=terminal velocity,

Vi=initial velocity,

A=accelerations Ax, Ay, Az, and t=time.

Assuming accelerations at three consecutive points of time are:

t0=0.000 second, Ax=0.00 g t1=0.025 second, Ax=0.01 g t2=0.050 second, Ax=0.52 g t3=0.075 second, Ax=1.13 g Assuming that velocity is zeroed at t0, with g=9.8 m/s$^2$, velocities along the three axes at the three points of time, $Vx_{t1}$, $Vx_{t2}$, $Vx_{t3}$, are calculated as follows:

$$Vx_{t1}=Vx_{t0}+((Ax)*(t))$$

$$Vx_{t1}=0.00+((0.01)(9.8)*(0.025))$$

$$Vx_{t1}=0.00245 \text{ m/s}$$

$$Vx_{t2}=Vx_{t1}+((Ax)*(t))$$

$$Vx_{t2}=0.00245+((0.52)(9.8)*(0.025))$$

$$Vx_{t2}=0.12985 \text{ m/s}$$

$$Vx_{t3}=Vx_{t2}+((Ax)*(t))$$

$$Vx_{t3}=0.12985+((1.13)(9.8)*(0.025))$$

$$Vx_{t3}=0.4067 \text{ m/s}$$

Upon acquisition of the velocities along their respective axes, brightness can be calculated by means of average absolute velocity at individual points of time:

$$AV=(|Vx|+|Vy|+|Vz|)/3, \text{ wherein } AV=\text{average absolute velocity.}$$

An equation of its brightness range is as follows:

$$(AVu-AV)/(AV-AV1)=(Bu-Ba)/(Ba-B1)$$

wherein

AVu=upper limit of average absolute velocity, and

AV1=lower limit of average absolute velocity.

Brightness Variation 6: Vector Velocity

Brightness variation 6 is similar to brightness variation 5 except that brightness variation 6 involves calculating vector velocity VV, instead of average absolute velocity, using a mathematic norm, wherein $$VV=\sqrt{(Vx^2+Vy^2+Vz^2)} \text{ and } VV=\text{vector velocity.}$$

An equation of its brightness range is as follows:

$$(VVu-VV)/(VV-VV1)=(Bu-Ba)/(Ba-B1)$$

wherein

VVu=upper limit of vector velocity, and

VV1=lower limit of vector velocity.

Brightness Variation 7: Differentiation Between Consecutive Points of Time in Vector Velocity Brightness variation 7 involves adjusting brightness using differentiation DV in vector velocity between two consecutive datasets.

Assuming velocities along the three axes at two points of time are calculated as follows:

At point of time 1, $Vx_{t1}$=velocity along X-axis=0.012 m/s $Vy_{t1}$=velocity along Y-axis=0.503 m/s $Vz_{t1}$=velocity along Z-axis=0.111 m/s At point of time 2, $Vx_{t2}$=velocity along X-axis=0.020 m/s $Vy_{t2}$=velocity along Y-axis=1.150 m/s $Vz_{t1}$=velocity along Z-axis=0.412 m/s Differentiation in vector velocity is calculated as follows:

$VV_{t1}$=vector velocity at point of time 1

$$VV_{t1}=\sqrt{((Vx_{t1})^2+(Vy_{t1})^2+(Vz_{t1})^2)}$$

$$VV_{t1}=\sqrt{((0.012)^2+(0.503)^2+(0.111)^2)}$$

$$VV_{t1}=0.515 \text{ m/s}$$

$VV_{t2}$=vector velocity at point of time 2

$$VV_{t2}=\sqrt{((Vx_{t2})^2+(Vy_{t2})^2+(Vz_{t2})^2)}$$

$$VV_{t2}=\sqrt{((0.020)^2+(1.150)^2+(0.412)^2)}$$

$$VV_{t2}=1.222 \text{ m/s}$$

Differentiation in vector velocity is defined as:

$$DV=VV_{t2}-VV_{t1}$$

$$DV=1.222 \text{ m/s}-0.515 \text{ m/s}$$

$$DV=0.707 \text{ m/s}$$

An equation of its brightness range is as follows:

$$(DVu-DV)/(DV-DV1)=(Bu-Ba)/(Ba-B1)$$

wherein

DVu=upper limit of differentiation in vector velocity, and

DV1=lower limit of differentiation in vector velocity.

Brightness Variation 8: Differentiation Between Consecutive Points of Time in Velocity Along the Three Axes Brightness variation 8 is similar to brightness variation 7 except that brightness variation 8 involves adjusting brightness of the three colors of RGB using the differentiation in velocity along the three axes DVx, DVy, DVz respectively.

Differentiation between two points of time in velocity along X-axis, Y-axis, and Z-axis are defined as follows:

DVx=$Vx_{t2}-Vx_{t1}$=differentiation in velocity along X-axis

DVy=$Vy_{t2}-Vy_{t1}$=differentiation in velocity along Y-axis

DVz=$Vz_{t2}-Vz_{t1}$=differentiation in velocity along Z-axis

Brightness of different colors can be adjusted, so as to acquire different color effects.

$$(DVu-DVx)/(DVx-DV1)=(Bu-Br)/(Br-B1)$$

$$(DVu-DVy)/(DVy-DV1)=(Bu-Bg)/(Bg-B1)$$

$$(DVu-DVz)/(DVz-DV1)=(Bu-Bb)/(Bb-B1)$$

wherein

DVu=upper limit of differentiation in velocity,

DV1=lower limit of differentiation in velocity,

Br=brightness of red,

Bg=brightness of green,

Bb=brightness of blue,

Bu=upper limit of brightness, and

B1=lower limit of brightness.

In the event of variation 1, correlation between brightness and RGB values is expressed as follows:

$$R/197=Br/100\%,$$

$$G/135=Bg/100\%, \text{ and}$$

$$B/22=Bb/100\%.$$

Using the above method, any color, and brightness thereof, of a lamp based on the three colors of RGB can be controlled with a 3-axis accelerometer sensor.

The foregoing specific embodiments are only illustrative of the features and functions of the present invention but are not intended to restrict the scope of the present invention. All equivalent modifications and variations made in the foregoing embodiments according to the spirit and principles of the present invention should fall within the scope of the appended claims.

What is claimed is:

1. A method for controlling light, comprising steps of:

retrieving accelerations along an X-axis, a Y-axis, and a Z-axis with a 3-axis accelerometer sensor;

matching the retrieved accelerations with RGB values; and transforming the RGB values and displaying a color of the transformed RGB values.

2. The method for controlling light of claim 1, further comprising steps of controlling RGB colors with data about the X-axis, the Y-axis, and the Z-axis, namely controlling the R color with the data about the X-axis, controlling the G color with the data about the Y-axis, and controlling the B color with the data about the Z-axis.

3. The method for controlling light of claim 1, wherein a range of accelerations retrieved by the 3-axis accelerometer sensor along the X-axis, the Y-axis, and the Z-axis can be linearly correlated with the RGB values from (0, 0, 0) to (255, 255, 255).

4. A method for controlling light, comprising steps of:

retrieving accelerations Ax, Ay, and Az along an X-axis, a Y-axis, and a Z-axis with a 3-axis accelerometer sensor; and calculating a velocity Vi along the X-axis, the Y-axis, and the Z-axis using the accelerations Ax, Ay, and Az, with i denoting directions x, y, and z, Vi=Vio+Ait expressing a terminal velocity in the direction i, Vio denoting an initial velocity in the directions i, Ai denoting the acceleration in the direction i, and t denoting time, thereby allowing variation of brightness to be controlled in eight modes comprising:

A. Average absolute acceleration AA, wherein $$AA=((|Ax|+|Ay|+|Az|)/3);$$

B. Scalar magnitude VA of vector acceleration, wherein $$VA=\sqrt{(Ax^2+Ay^2+Az^2)};$$

C. Differentiation DA between consecutive points of time t1 and t2 in scalar magnitude VA of vector acceleration, wherein $$DA=VA_{t2}-VA_{t1},$$

$$VA=\sqrt{(Ax^2+Ay^2+Az^2)},$$

t1 denotes point of time 1, and
t2 denotes point of time 2;

D. Differentiation DAx, DAy, and DAz between consecutive points of time t1 and t2 in accelerations Ax, Ay, and Az along the X-axis, the Y-axis, and the Z-axis, wherein $$DAx=Ax_{t2}-Ax_{t1},$$

$$DAy=Ay_{t2}-Ay_{t1}, \text{ and}$$

$$DAz=Az_{t2}-Az_{t1};$$

E. Average velocity AV, wherein $$AV=((|Vx|+|Vy|+|Vz|)/3);$$

F. Scalar magnitude VV of vector velocity, wherein $$VV=\sqrt{(Vx^2+Vy^2+Vz^2)};$$

G. Differentiation DV between consecutive points of time t1 and t2 in scalar magnitude VV of vector velocity, wherein $$VV=\sqrt{(Vx^2+Vy^2+Vz^2)},$$

$$DV=VV_{t2}-VV_{t1},$$

t1 denotes point of time 1, and
t2 denotes point of time 2; and

H. Differentiation DVx, DVy, DVz between consecutive points of time t1 and t2 in velocities Vx, Vy, Vz along the three axes, wherein $$DVx=Vx_{t2}-Vx_{t1},$$

$$DVy=Vy_{t2}-Vy_{t1},$$

$$DVz=Vz_{t2}-Vz_{t1},$$

t1 denotes point of time 1, and
t2 denotes point of time 2.

5. The method for controlling light of claim 4, wherein the brightness is further matched with R, G, and B values (values of three primary colors) by equations: R/197=Br/100%, G/135=Br/100%, and B/22=Br/100%, with a calculated R, G, or B value being compulsorily set to 255 if the calculated R, G, or B value exceeds 255.

* * * * *